Inventors
Jun Watanabe
Akira Nakashima
By Stevens, Davis, Miller & Mosher
Attorneys United States Patent Office 3,230,112
Patented Jan. 18, 1966

3,230,112
SEALED ALKALINE STORAGE BATTERY
Jun Watanabe, Kobe, and Akira Nakashima, Hirakata-shi, Japan, assignors to Matsushita Electric Industrial Co., Ltd., Kitakawachi-gun Osaka, Japan, a corporation of Japan
Filed Oct. 29, 1962, Ser. No. 233,621
Claims priority, application Japan, Oct. 31, 1961, 36/39,561
3 Claims. (Cl. 136—14)

The present invention relates to sealed type batteries and is intended to increase the surface areas of both positive and negative electrodes of such batteries for the purpose of improving the utilization factor of the active materials therein and thus making it possible to quickly charge and discharge such batteries particularly of large capacities.

According to the present invention, there is provided a sealed type battery comprising positive electrode units of prismatic form of sectorial cross section as obtainable by longitudinally splitting a semicylinder into at least two identical segments and negative electrode units of the same form as said positive electrode units arranged alternately therewith in a radial array to form a cylindrical compound electrode assembly with separators interposed between the adjacent positive and negative electrode units.

Previous sealed type batteries have included a battery structure comprising in combination a cylindrically shaped positive electrode, a negative electrode assembly including a plurality of molded negative electrode units in the form of segments as obtainable by longitudinally splitting a hollow cylinder, and an electrically insulating separator material such as nylon fabric interposed between the positive and negative electrodes, or a battery structure comprising in combination a cylindrical positive electrode assembly including molded positive electrode units in the form of prismatic segments as obtainable by longitudinally splitting a cylinder along at least two radial planes, a negative electrode assembly including a plurality of molded negative electrode units in the form of segments as obtainable by longitudinally splitting a hollow cylinder, and an electrically insulting separator material interposed between said positive and negative electrodes.

With these conventional forms of sealed type battery, it is impossible to enlarge the surface areas of the positive and negative electrode assemblies themselves beyond certain limits. Also, the opposing reaction surfaces of the positive and negative electrode assemblies cannot be enlarged to any substantial extent. In addition, the positive and negative electrodes have different shapes. Therefore, the active material utilization factor of such batteries cannot be held uniform involving the danger of gas formation within the battery and thus rendering any quick charging and discharging practically infeasible.

According to the present invention, the battery comprises a cylindrical compound electrode assembly including an alternate arrangement of positive and negative electrode units of sectorial cross section with separators interposed therebetween. For example, in case the battery is of the "C" size, the surface areas of the positive and negative electrodes are made approximately three to four times as large as those of conventional batteries of the type, the active material utilization factor being approximately doubled. Also, the battery of the invention has a capacity approximately one and half times as large as that of conventional ones of the same bulk and is capable of being quickly charged and discharged at rates more than twice as high as those with conventional batteries.

The present invention will now be described with reference to the accompanying drawing, which illustrates one preferred embodiment of the invention including positive and negative electrode units of prismatic form as obtainable by longitudinally splitting a semicylinder into four identical segments. In the drawing.

Figure 1:
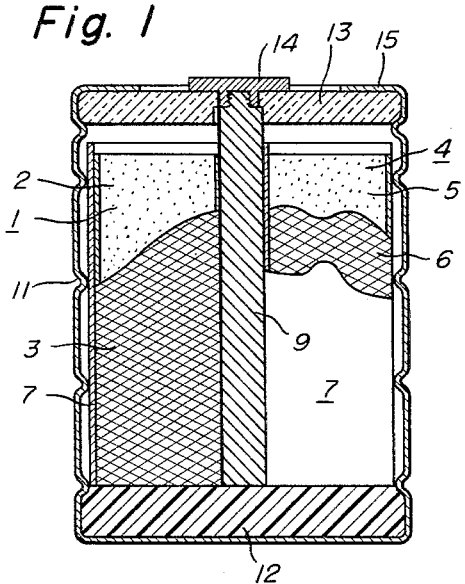
FIG. 1 is a cross-sectional elevation of a sealed type alkaline storage battery embodying the invention.
Figure 2:
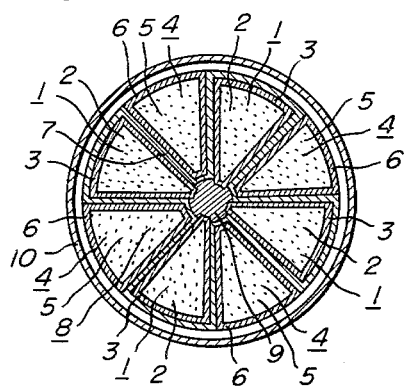
FIG. 2 is a transverse cross-sectional view of same.

Referring first to FIGS. 1 and 2, the sealed type alkaline storage battery shown comprises four identical positive electrode units 1 and four identical negative electrode units 4. The positive electrode units 1 each include a prismatic molding 2 of sectorial cross section made of a mixture of nickel hydroxide and flake graphite and covered with a nickel wire mesh 3. The negative electrode units 4 each include a prismatic molding 5 sectorial in iron oxide and covered with a nickel wire mesh 6. The radius of curvature of the curved outside surface of the negative electrode units is equal to that of the positive electrode units. Separators 7 are interposed between the adjacent positive and negative electrode units as shown clearly in FIG. 2 and take the form of a filtering sheet or fabric made of polyvinyl alcohol or polyamide fibers. The positive and negative electrode units are alternately arranged in a radial array with the separators interposed therebetween to form a cylindrical compound electrode assembly as generally indicated at 8.

A positive terminal rod 9 extends axially through the compound electrode assembly 8 in direct contact with the positive electrode units 1 but electrical contact with the negative electrode units is prevented by way of the separators 7. The rod 9 takes the form of a steel rod nickel-plated over the surfaces thereof. A containing jar 10 is a steel container nickel-plated over the surfaces thereof and serves as a negative terminal while accommodating the compound electrode assembly. The jar 10 is cylindrical and formed in the side wall with a number of axially spaced circumferentially extending grooves 11. A bottom plate 12 formed preferably of polyethylene is disposed in the bottom of said containing jar 10. A sealing plate 13 of polyethylene or nylon is arranged in the top of the jar 10. As shown, the positive terminal rod 9 carries at its top a positive terminal 14 embedded in the sealing plate 13.

In assembling the sealed type alkaline storage battery, bottom plate 12 is first inserted into the bottom of the container 10, which is then filled with the compound electrode assembly 8. The positive terminal rod 9 with positive terminal 14 threadably fitted to the top thereof is then inserted into the compound electrode assembly axially thereof. The sealing plate 13 is then clamped about its periphery by inwardly bending the top peripheral edge portion 15 of the containing jar 10 to complete a sealed type alkaline storage battery as shown.

An electrolyte preferable for use in this battery is a caustic alkali such as caustic potash. The electrolyte is affixed to the positive and negative electrode units and separators 7 by impregnation.

Gases basically including oxygen gas, which forms at the positive side of the battery during operation or shutdown, enter the space defined between the periphery of the compound electrode assembly 8 and the grooved wall of the containing jar 10 and thus come into contact with the units of the negative polarity to be absorbed and consumed therein so that the gas pressure within the battery is maintained at a predetermined level. In this connection, if the gases formed are absorbed immediately by the negative electrodes to oxidize the latter, the negative electrodes would be discharged with the result that gases comprised mainly of hydrogen are formed at the negative electrodes. It would be difficult for such gases to be recombined with the positive electrodes because of the oxidation effect. Therefore, the entire capacity of the negative electrodes should be determined at a level higher than that of the positive terminals to obviate formation of hydrogen gas.

As will be appreciated, the sealed type alkaline storage battery described above includes electrodes having markedly increased reaction surface areas and thus are fully capable of quick discharging. Also, the positive and negative electrodes are identical in form and thus can easily be made in the same bulk and specific gravity. Moreover, the electrodes can be molded and put together into a compound electrode assembly with extreme ease.

It is to be noted that with this sealed type battery in which the positive and negative electrodes have surface areas equal to each other, there exists no unbalance in gas formation between the positive and negative electrodes. In addition, when the battery is charged, the positive electrode units slightly expand while the negative electrode units are chemically reduced and thus contract. This makes the mechanical forces possibly occurring between the battery components substantially uniform making the entire battery structure extremely stable.

Though description has been made hereinbefore in connection with sealed type batteries having separators interposed between the positive and negative electrode units, the same advantageous features may be obtained with batteries having electrode units individually covered with a separator. The principles of the present invention can be applied not only to alkaline storage batteries as illustrated but also to alkaline manganese dry cells, mercury cells, silver-cadmium cells and other like cells. It is not, therefore, wished to be understood as limiting the invention to the particular embodiment disclosed above, except as it may be so limited by the appended claims.

Next, the charge and discharge characteristics of the sealed type alkaline storage battery described above and embodying the invention will be described in detail.

Figure 3:
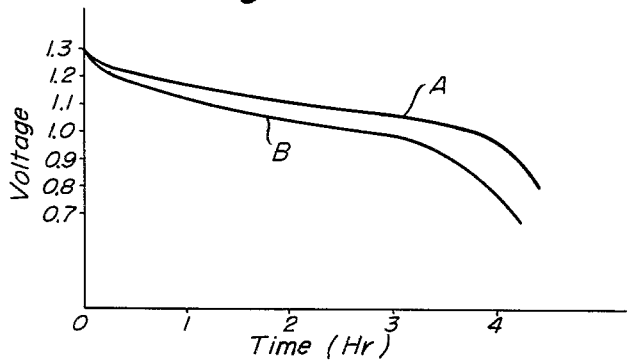
FIG. 3 represents discharge characteristic curves of the battery shown in FIGS. 1 and 2 and a conventional sealed type alkaline storage battery.

In FIG. 3, the curve A shows typical terminal voltages obtained when a sealed type alkaline storage battery constructed as shown in FIGS. 1 and 2 was discharged at normal rate, while the curve B shows those obtained when a conventional sealed type alkaline storage battery was discharged which comprised a cylindrical positive electrode surrounded by negative electrode units in the form of segments as obtainable by longitudinally splitting a hollow cylinder into identical pieces. The batteries used in this comparison were of the "C" size, which corresponds to the size of "Single No. 2" manganese dry cells. The discharge was effected at a constant rate of 400 ma.

Figure 4:
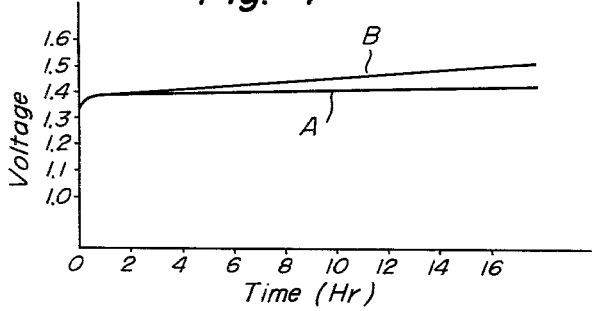
FIG. 4 represents charge characteristic curves of the batteries compared in FIG. 3 when charged at 150-ma. 14-hour rate.

FIG. 4 represents characteristic curves obtained when the same batteries as used in FIG. 3 were charged at 150-ma.,14-hour rate, the curves A and B corresponding to the inventive and conventional batteries, respectively, as in FIG. 3.

As apparent from the foregoing, the sealed type alkaline storage battery A embodying the present invention includes electrodes having reaction areas substantially larger than those of the conventional sealed type alkaline storage battery B. In addition, the contact areas between the positive and negative electrodes of the inventive battery A extend radially outwardly from the center thereof and both the positive and negative electrodes are subjected to uniform forces acting radially thereof and thus kept free from any deformation due to uneven physical forces which might otherwise be caused by charging or discharging of the battery. The charge characteristic of the battery is such that the voltage never exceeds 1.45 volts even when the battery is overcharged. Accordingly, as will readily be appreciated, there is no danger that gases be formed during charging to such an extent as to damage the battery. Also, it may safely be said that reduction in capacity due to charging and discharging is substantially eliminated with this inventive battery.

Figure 5:
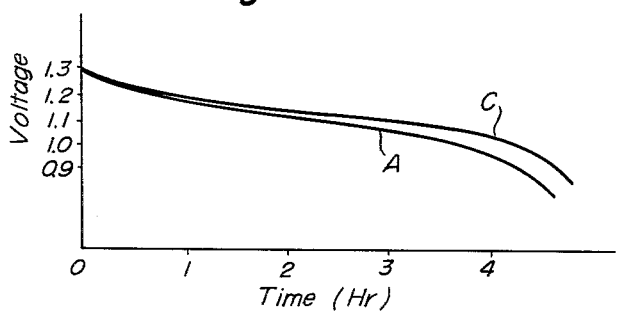
FIG. 5 represents discharge characteristic curves of two sealed type alkaline storage batteries according to the present invention, one including four electrode units of either polarity and the other including six electrode unts of either polarity.

Reference is now made to FIG. 5, which represents discharge characteristic curves of two sealed type alkaline storage batteries when discharged at 400 ma. rate. One of the batteries having a characteristic curve A is identical to that shown in FIGS. 1 and 2, while the other battery the discharge curve of which is indicated at C has positive and negative electrode units both of prismatic form as obtainable by longitudinally splitting a semicylinder into six identical segments but not into four segments as with the case of the battery A shown in FIGS. 1 and 2.

As will readily be observed, the increase in the number of the positive as well as negative electrode units acts to increase the total area of the reaction surfaces and the utilization factor of the active materials thereby to increase the capacity of the battery. In practical applications, however, the number of the positive or negative electrode units is desirably determined in the range of 4 to 12, taking into consideration the efficiency in the actual assembling operation and the appropriate area of the reaction surfaces.

Figure 6:
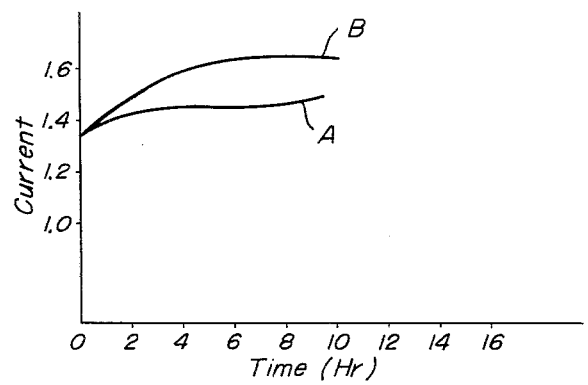
FIG. 6 represents the charge characteristic curves of the two batteries compared in FIG. 3 when charged at 300-ma. 7-hour rate.

FIG. 6 represents charge characteristic curves of the batteries compared in FIG. 3 when charged at 300-ma. 7-hour rate.

As observed, the voltage of the conventional sealed type alkaline storage battery B rises during the charging reaction to form gases involving the danger of destroying the equilibrium between the positive and negative electrodes so as to damage the battery. Accordingly, any charging rate higher than 10-hour rate has been infeasible with such conventional batteries. If the conventional battery B be quickly charged, for example, at 300-ma. 7-hour rate, which is twice as high as the usual 150-ma. 14-hour rate, the voltage would exceed 1.6 volts when overcharged, accelerating the gas formation to such an extent as to damage the battery. If the charging be interrupted at a level below 1.6 volts, the active material utilization factor would be limited and the heat generation in the interior of the battery would act to lower the capacity thereof.

In contrast with this, in case of the sealed type alkaline storage battery A constructed according to the present invention, the terminal voltage V never exceeds 1.45 v. causing no gas formation even when it is quickly charged at a rate twice as high as that conventionally employed. Thus, the inventive battery can be charged quite safely without causing any reduction in its active material utilization faction.

Figure 7:
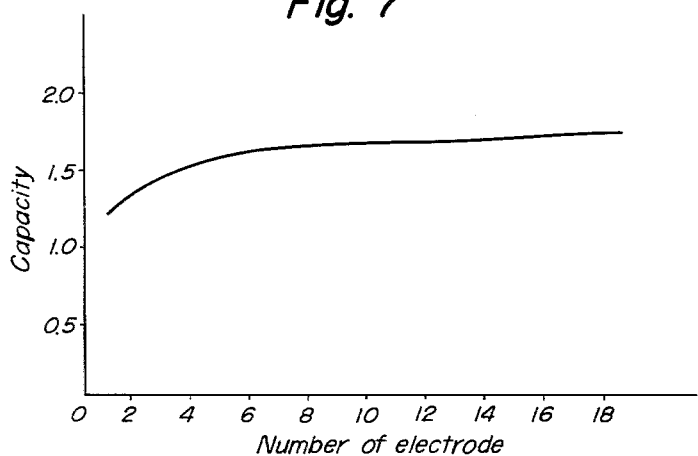
FIG. 7 represents the relationship between the number of electrode units of either polarity and the capacity of an enclosed type alkaline storage battery of the "C" size embodying the present invention.

Reference is next made to FIG. 7, which illustrates the relationship between the number of the electrode units of either polarity included in a sealed type alkaline storage battery of the "C" size constructed according to the invention and the capacity thereof for the 10-hour discharge rate.

As observed, the battery has a highly improved performance with its capacity exceeding 1.5 ampere-hours where it includes at least four electrode units of either polarity, but any substantial increase in capacity cannot be expected with batteries including more than twelve units for either polarity. In other words, the number of electrode units of either polarity included in a single battery according to the present invention is preferably determined in the range of 4 to 12.

Figure 8:
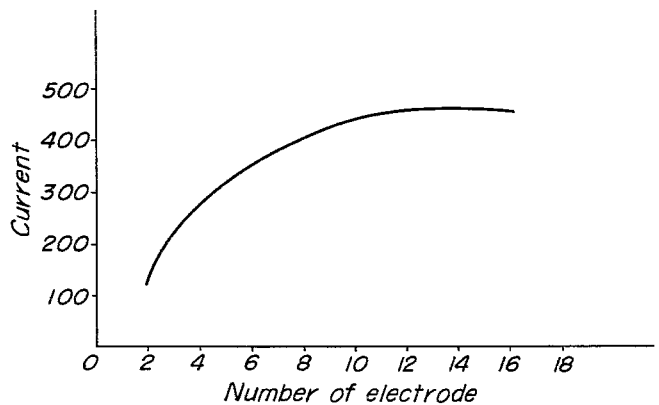
FIG. 8 represents the relationship between the number of electrode units of either polarity and the largest allowable charging current of the same battery.
Figure 9:
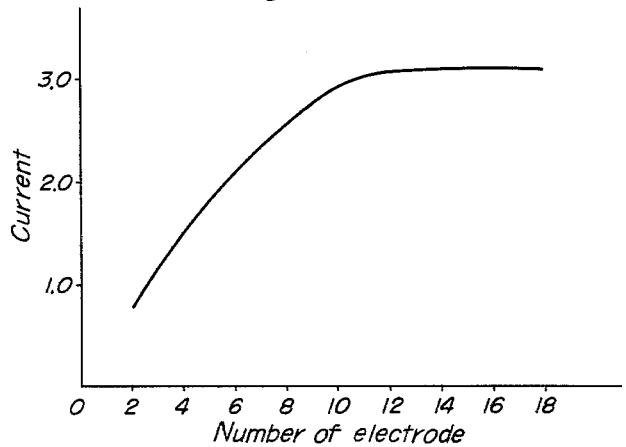
FIG. 9 represents the relationship between the number of electrode units of either polarity and the largest allowable discharging current of the same alkaline storage battery.

FIGS. 8 and 9 illustrate the relationship between the number of electrode units of either polarity included in a sealed type alkaline storage battery of the "C" size constructed according to the invention and the largest allowable charge and discharge current, respectively, of the battery.

It will be observed that both the quick charging and the quick discharging can be effected most efficiently when the number of electrode units of either polarity is from 4 to 12.

In the above, description has been made in connection with the so-called pocket type electrode units, which are each formed of a molding of active materials covered with a wire mesh, for example, of nickel. It will readily be understood, however, by those skilled in the art that the present invention may also employ so-called sintered type electrode units, which include a foraminous base formed by sintering a metal powder such as nickel powder and impregnated with suitable active materials.

As described above, the inventive battery construction comprises a cylindrical compound electrode assembly including positive and negative electrode units both of prismatic form as obtainable by longitudinally splitting a semi-cylinder into at least two identical segments, said positive and negative electrode units being alternately arranged in a radial array with separators interposed between the adjacent positive and negative electrode units. With this arrangement, it will be appreciated that the total area of the reaction surfaces of the positive as well as negative electrode can be substantially increased and the same total reaction area is ensured for both positive and negative electrodes thereby eliminating any unbalance in gas formation between the positive and negative electrodes. Thus, the sealed type battery constructed and arranged according to the present invention has highly excellent charge and discharge characteristics.

What is claimed is:

1. A sealed alkaline storage battery comprising a metallic container, a top for said container, a plurality of positive electrodes, a plurality of negative electrodes, each of said positive and negative electrodes being in the form of a cylindrical section, said positive and negative electrodes arranged alternately in radial array to form a cylindrical assembly of said positive and negative electrodes, each of said positive electrodes being between two negative electrodes and each of said negative electrodes being between two positive electrodes, a space at the apex of said positive and negative electrodes formed by said radial array, a conductive rod in said space threadably fitted into said top, said rod being the positive electrode terminal, separator means between said alternate positive and negative electrodes, said separator means being further disposed so as to isolate each said negative electrode from said rod, means connecting the negative electrodes to said container, said container being the negative electrode terminal, insulating means between said assembly and the bottom of said container, space between the periphery of said assembly and said container, grooves in the wall of said container forming said space at the periphery of said assembly, electrolyte substantially fixed in the pores of said positive and negative electrodes and said separator means, and sealing means enclosing said battery.

2. In a sealed-type storage battery according to claim 1 wherein the number of either positive or negative electrode units is in the range of from 4 to 12.

3. A sealed battery according to claim 1 wherein the positive and negative electrodes are of a pie-shaped section obtained by dividing vertically and equally a pillar body semicircular in shape in section into more than two pieces.

References Cited by the Examiner

UNITED STATES PATENTS

| | | | |
|---|---|---|---|
| 2,534,056 | 12/1950 | Pitt | 136—90 |
| 2,941,022 | 6/1960 | Mandel | 136—6 |
| 2,980,747 | 4/1961 | Daley | 136—24 X |
| 3,043,899 | 7/1962 | Coleman | 136—108 |

WINSTON A. DOUGLAS, *Primary Examiner.*

MURRAY TILLMAN, *Examiner.*

B. J. OHLENDORF, *Assistant Examiner.*